(12) United States Patent  (10) Patent No.: US 12,347,402 B2
Li                        (45) Date of Patent:     Jul. 1, 2025

(54) DISPLAY PANEL, DRIVING METHOD, AND DISPLAY DEVICE

(71) Applicant: HKC CORPORATION LIMITED, Shenzhen (CN)

(72) Inventor: Zeyao Li, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 270 days.

(21) Appl. No.: 17/289,747

(22) PCT Filed: Dec. 31, 2019

(86) PCT No.: PCT/CN2019/130237
§ 371 (c)(1),
(2) Date: Mar. 27, 2024

(87) PCT Pub. No.: WO2020/143501
PCT Pub. Date: Jul. 16, 2020

(65) Prior Publication Data
US 2024/0233675 A1   Jul. 11, 2024

(30) Foreign Application Priority Data

Jan. 9, 2019 (CN) .................. 201910018437.0
Jan. 9, 2019 (CN) .................. 201910018513.8

(51) Int. Cl.
*G09G 3/36* (2006.01)
*G02F 1/1362* (2006.01)
*G06F 3/048* (2013.01)

(52) U.S. Cl.
CPC ..... *G09G 3/3648* (2013.01); *G02F 1/136286* (2013.01); *G09G 3/3677* (2013.01); *G06F 3/048* (2013.01); *G09G 2310/08* (2013.01)

(58) Field of Classification Search
CPC .............. G09G 3/3677; G09G 2310/08; G02F 1/136286
USPC ............................................................ 345/98
See application file for complete search history.

(56) References Cited

U.S. PATENT DOCUMENTS

| 9,842,551 B2 * | 12/2017 | Yamashita ........... G09G 3/3611 |
| 2003/0043104 A1 * | 3/2003 | Lee ....................... G09G 3/3677 345/100 |
| 2006/0061535 A1 * | 3/2006 | Kim ..................... G11C 19/184 345/98 |

(Continued)

FOREIGN PATENT DOCUMENTS

| CN | 106448466 A | 2/2017 |
| CN | 106898324 A | 6/2017 |

(Continued)

OTHER PUBLICATIONS

Hong Gu, the International Searching Authority written comments, Mar. 2020, CN.
Hong Gu, the International Searching Report, Mar. 2020, CN.

*Primary Examiner* — Kwin Xie

(57) ABSTRACT

Disclosed are a display panel, a driving method, and a display device. The display panel includes a first display screen that includes a first scan line; a second display screen that includes a second scan line; and a first gate drive circuit coupled to the first scan line and the second scan line, where the first scan line and the second scan line are not coupled to each other.

4 Claims, 9 Drawing Sheets

(56) References Cited

U.S. PATENT DOCUMENTS

| | | | | |
|---|---|---|---|---|
| 2015/0364396 A1* | 12/2015 | Asai | ................ | H01L 29/78633 |
| | | | | 257/43 |
| 2016/0104449 A1* | 4/2016 | Huang | ................ | G11C 19/287 |
| | | | | 377/64 |
| 2017/0148374 A1* | 5/2017 | Lee | ................ | G02F 1/13336 |
| 2018/0190631 A1* | 7/2018 | Kim | ................ | H01L 25/162 |
| 2019/0005915 A1* | 1/2019 | Liu | ................ | G09G 5/003 |
| 2020/0135132 A1* | 4/2020 | Tanaka | ................ | G09G 3/3677 |
| 2020/0161405 A1* | 5/2020 | Kim | ................ | G09G 3/32 |
| 2020/0286570 A1* | 9/2020 | Shan | ................ | G09G 3/2092 |

FOREIGN PATENT DOCUMENTS

| | | |
|---|---|---|
| CN | 107527933 A | 12/2017 |
| CN | 107993575 A | 5/2018 |
| CN | 107993613 A | 5/2018 |
| CN | 108806630 A | 11/2018 |
| CN | 109637477 A | 4/2019 |
| CN | 109767735 A | 5/2019 |

\* cited by examiner

DISPLAY PANEL, DRIVING METHOD, AND DISPLAY DEVICE

This application claims the priority to and benefit of Chinese patent application CN 201910018437.0, entitled "Display Panel, Driving Method, and Display Device" and filed Jan. 9, 2019, and Chinese patent application number CN 201910018513.8, entitled "Driving Method and System of Display Panel, and Display Device" and filed Jan. 9, 2019, with China National Intellectual Property Administration, the entire contents of which are incorporated herein by reference.

TECHNICAL FIELD

This application relates to the field of display technology, and more particularly relates to a display panel, a driving method, and a display device.

BACKGROUND

The statements herein are intended for the mere purposes of providing background information related to the present application but don't necessarily constitute the prior art.

With the rapid development of thin film transistor liquid crystal displays, various manufacturers are actively pursuing new technologies to improve the market competitiveness of their products and reduce product costs. As a representative of the new technology, the Gate Driver on Array (GOA) technology is essentially to integrate the Gate switch circuits onto the array substrate, so that the part of the gate drive integrated circuit can be removed, thereby saving materials and reducing process steps to achieve the purpose of reducing product costs.

When using GOA for driving purposes, if the array substrate has a relatively large size hence a very long scan line, then if driven from only one side, the gate start signal at the end close to the gate drive circuit will have a corresponding rectangular waveform, while the waveform at the end of the scan line away from the gate drive circuit may deteriorate due to impedance or other losses, such that the switching action cannot be well accomplished. Therefore, there is an urgent need for a driving mechanism capable of handling the load of a large-size liquid crystal display.

SUMMARY

The present application provides a display panel, a driving method, and a display device that can perform bilateral output at the output ends of a gate drive circuit.

This application discloses a display panel that includes a first display screen, a second display screen, and a first gate drive circuit. A first scan line is arranged in the first display screen, and a second scan line is arranged in the second display screen. The first gate drive circuit is coupled to the first scan line and to the second scan line, and the first scan line and the second scan line are not coupled to each other.

This application discloses a display panel, which includes a plurality of display screens and a plurality of first gate drive circuits, where the plurality of display screens are arranged in the form of X*Y and are formed on the same substrate. The plurality of first gate drive circuits are each arranged between two adjacent display screens to drive the two adjacent display screens, where X indicates the number of display screen in each column in a first direction, Y indicates the number of display screens in each row in a second direction, the first direction being perpendicular to the second direction; X is a positive integer greater than or equal to 1, and Y is a positive integer greater than or equal to 2.

This application further discloses a driving method for the display panel as described above, the display panel including a first gate drive circuit timing control circuit, the driving method includes the following operations:
  receiving, by the first gate drive circuit, a clock signal output by the timing control circuit; and
  scanning, by the first gate drive circuit, the first scan line and the second scan line simultaneously according to a same set of clock signals.

Compared with the scheme where the gate drive circuit is merely capable of unilateral output, in the present application the first gate drive circuit simultaneously outputs scan signals to the first scan line of the first display screen and the second scan line of the second display screen, where the first scan line and the second scan line per se are not coupled with each other, which are thus equivalent to a very long scan line divided into two segments. As such, the farthest distance measured from each of the first scan line in the first display screen and the second scan line in the second display screen to the first gate drive circuit or in other words to the input terminal of the gate start signal can be greatly reduced. After the length of the scan line that needs to be scanned is greatly reduced, the resistance of the scan line between the far end of the scan line and the gate drive circuit becomes smaller and the interference becomes less. The attenuation of the corresponding gate start signal will be well improved, thereby greatly improving the scan waveform at the farthest end of the scan line, so that the scan line can work steadily, improving the problem of excessive load on large-size display panels and the severe scan waveform distortion issues caused by excessive load.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

Figure 1:
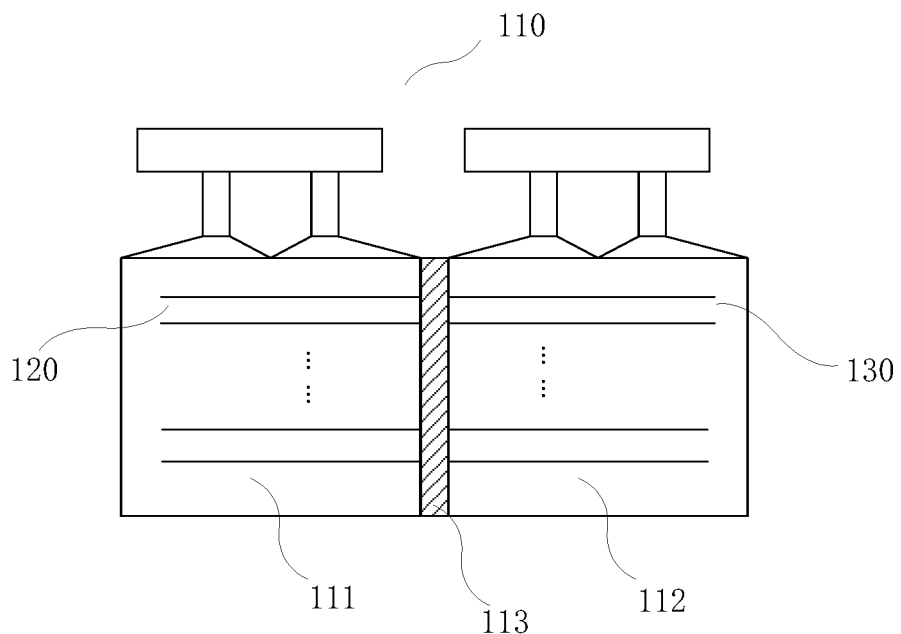
FIG. 1 is a schematic diagram of a display panel according to an embodiment of the present application.

It should be understood that the terms used herein, and the specific structure and functional details disclosed therein are intended for mere purposes of illustrating specific embodiments and are merely representative. However, this application can be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple" or "a plurality of" means two or more. The term "comprise", "comprising", "include", "including", and any variations thereof means non-exclusive inclusion, or in other words there is possibility of the presence or addition of one or more other features, integers, steps, operations, circuits, components, and/or combinations thereof.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms should not be construed as restricting the present disclosure.

Furthermore, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood on a case-by-case basis.

Hereinafter, this application will be described in further detail in connection with the drawings and some optional embodiments.

As illustrated in FIGS. 1 to 7, an embodiment of the present application discloses a display panel 110, which at least includes a first display screen 111 provided with a first scan line 120, a second display screen 112 provided with a second scan line 130, and a first gate drive circuit 113 coupled to the first scan line 120 and to the second scan line 130. The first scan line 120 and the second scan line 130 are not coupled or not directly coupled to each other.

That is, the first gate drive circuit 113 simultaneously outputs scan signals to the first scan line 120 of the first display screen 111 and the second scan line 130 of the second display screen 112, where the first scan line 120 and the second scan line 130 per se are not coupled with each other, which are thus equivalent to a very long scan line divided into two segments. As such, the farthest distance measured from each of the first scan line 120 in the first display screen 111 and the second scan line 130 in the second display screen 112 to the first gate drive circuit 113 or in other words to the input terminal of the gate start signal can be greatly reduced. After the length of the scan line that needs to be scanned is greatly reduced, the resistance of the scan line between the far end of the scan line and the gate drive circuit becomes smaller and the interference becomes less. The attenuation of the corresponding gate start signal will be well improved, thereby greatly improving the scan waveform at the farthest end of the scan line, so that the scan line can work steadily, improving the problem of excessive load on large-size display panels and the severe scan waveform distortion issues caused by excessive load.

Figure 2:
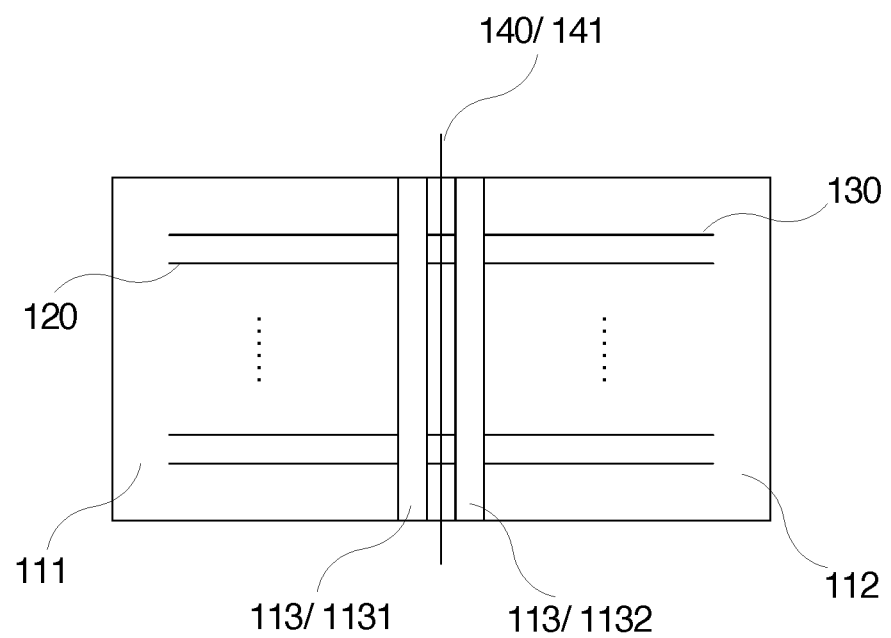
FIG. 2 is a schematic diagram of gate drive sub-circuits coupled to the same clock signal wire according to an embodiment of the present application.

As illustrated in FIG. 2, the first gate drive circuit 113 includes a first gate drive sub-circuit 1131 and a second gate drive sub-circuit 1132 which are arranged between the first display screen 111 and the second display screen 112. The display panel 110 further includes a first set of clock signal wires 141. The first gate drive sub-circuit 1131 is coupled to the first scan line 120 and to the first set of clock signal wires 141, and the second gate drive sub-circuit 1132 is coupled to the second scan line 130 and to the first set of clock signal wires 141.

The first gate drive circuit 113 includes a first gate drive sub-circuit and a second gate drive sub-circuit, and the first gate drive sub-circuit 1131 and the second gate drive sub-circuit 1132 are arranged between the first display screen and the second display screen. The first gate drive sub-circuit may control the scanning of the first scan line 120 of the first display screen 111. The second gate drive sub-circuit may control the scanning of the corresponding second scan line 130 of the second display screen 112. As such, the distance from the farthest ends of the first scan line and the second scan line to the first gate drive sub-circuit 1131 or the second gate drive sub-circuit 1132 can be greatly shortened. Accordingly, the load of the scan line between the farthest end of the scan line and the first gate drive circuit 113 is greatly reduced, which may greatly improve the scan waveform at the farthest end of the scan line. In addition, the first gate drive sub-circuit 1131 and the second gate drive sub-circuit 1132 are both coupled to the first set of clock signal wires 141 and receive the same clock signal, so that the scan lines can work steadily, thereby improving the excessive load on a large-size display panel and the issue of severe distortion of the scanning waveform caused by the excessive load.

The first gate drive circuit may also only provide one set of gate drive sub-circuits, which are coupled to the same set of clock signal wires 140. The set of clock signal wires may include a non-inverted clock signal line CLK and an inverted clock signal line CLKB, and the scan lines in the display screens on both sides are both connected to this set of gate drive sub-circuits. The set of gate drive sub-circuits may adopt the form of adding output ports or make the first scan line 120 and the second scan line 130 be coupled to each other, of course, other applicable methods are also possible. Thus, the two sets of gate drive sub-circuits can be coupled to the same set of clock signal lines 140, which can save a set of clock signal lines. Furthermore, the scanning signals of the display screens on both sides of the gate drive circuit can be ensured to synchronize, thus achieving a superior driving effect, hence a favorable display effect of the display panel 110.

Figure 3:
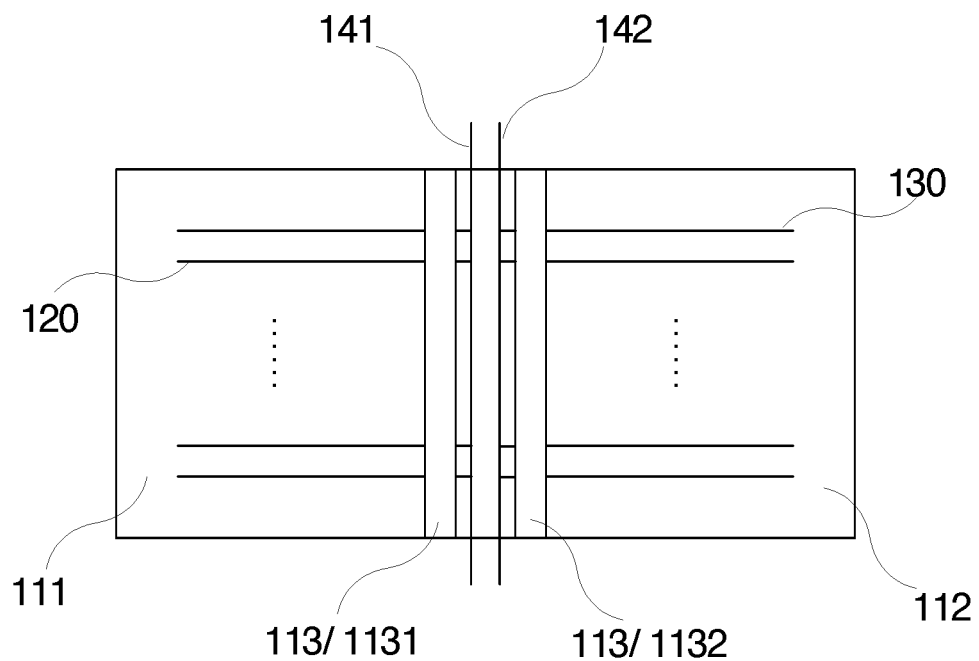
FIG. 3 is a schematic diagram of gate drive sub-circuits coupled to different clock signal wires according to another embodiment of the present application.
Figure 4:
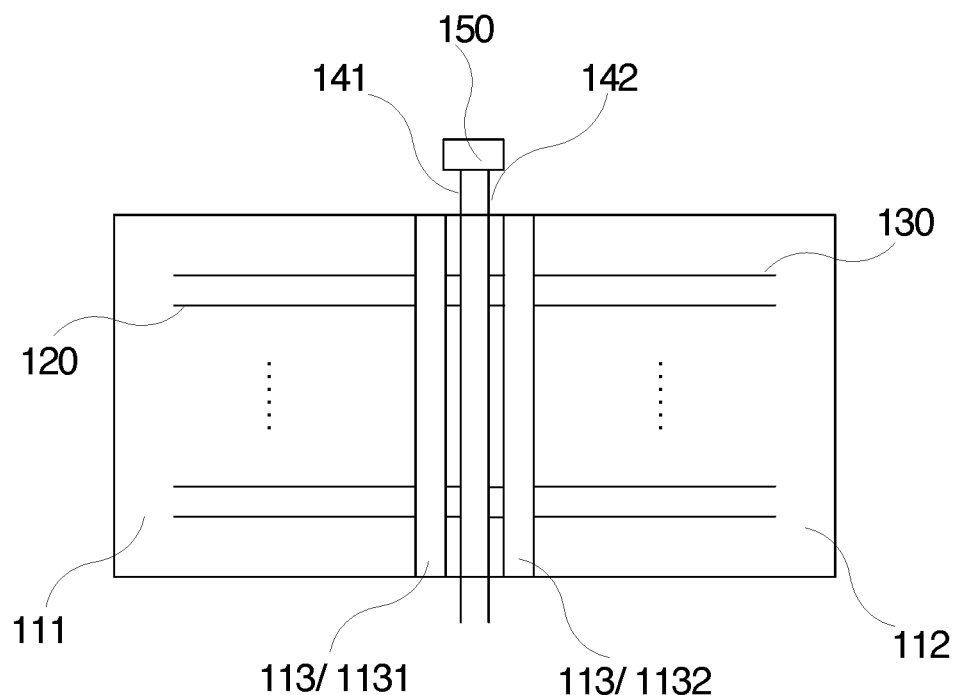
FIG. 4 is a schematic diagram illustrating a timing control circuit coupled to signal wires according to yet another embodiment of the present application.

As illustrated in FIGS. 3 to 4, the display panel includes a first gate drive circuit 113. The display panel includes a first set of clock signal wires 141 corresponding to the first display screen 111, and a second set of clock signal wires 142 corresponding to the second display screen 112. The first gate drive circuit 113 includes a first gate drive sub-circuit 1131 and a second gate drive sub-circuit 1132 disposed between the first display screen 111 and the second display screen 112. The first gate drive sub-circuit 1131 is coupled to the first scan line 120 and to the first set of clock signal wires 141, and the second gate drive sub-circuit is coupled to the second scan line and the second set clock signal wires.

In particular, if the first display screen 111 and the second display screen 112 are integrally formed, then the first set of clock signal wires 141 and the second set of clock signal wires 142, as well as the first gate drive sub-circuit 1131 and the second gate drive sub-circuit 1132 may be arranged between the first display screen and the second display screen. Otherwise, in the case where the first display screen and the second display screen are manufactured separately and then assembled together, then a Black Matrix (BM) may be set corresponding to the first gate drive circuit between the first display screen and the second display screen. The first set of clock signal wires and the corresponding gate drive sub-circuit may be formed in the peripheral area of the first display screen, and the second set of clock signal wires and the corresponding gate drive sub-circuit may be formed in the peripheral area of the second display screen, and then they may be assembled together.

The two sets of clock signals may be operative to control synchronous or asynchronous output. In the case of synchronous output, the screens can display pictures simultaneously, while in the case of asynchronous output, with the appropriate backlight drive and data drive, it may realize better control of the display of only one of the display screens, hence wider range and stronger selectivity.

The display panel 110 includes a timing control circuit 150. The first set of clock signal wires 141 and the second set of clock signal wires 142 are coupled to the timing control circuit 150, and where the first gate drive sub-circuit and the second gate drive sub-circuit in the first gate drive circuit share a low voltage signal line Vss.

The timing control circuit sends signals to the first set of clock signal wires and the second set of clock signal wires. The first gate drive circuit receives the same clock signals and simultaneously outputs them to the corresponding scan lines of the display screens on both sides. The timing control chip may control the synchronous output or asynchronous output of the first set of clock signal wires 141 and the second set of clock signal wires 142, which thus can adapt to more kinds of use environments and can meet up more kinds of requirements.

Figure 5:
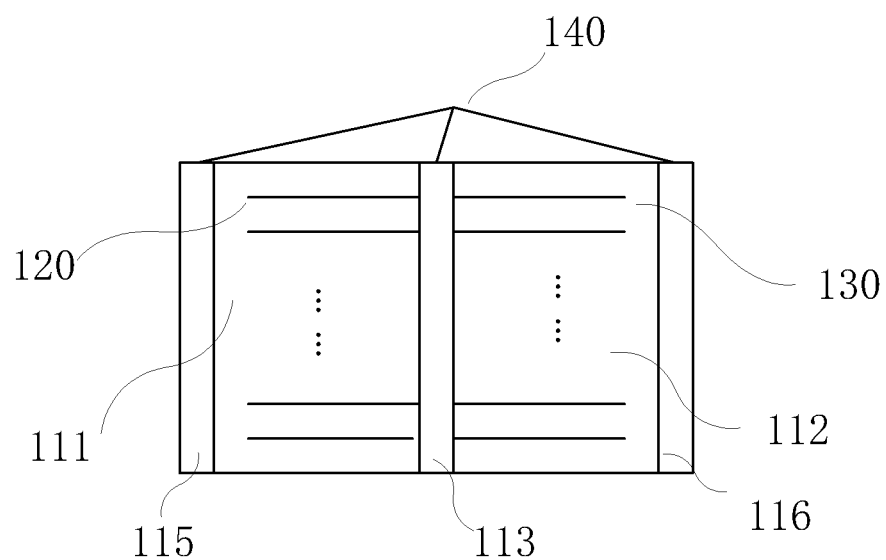
FIG. 5 is a schematic diagram illustrating multiple gate drive sub-circuits coupled to receiving the same clock signal according to still another embodiment of the present application.

As illustrated in FIG. 5, the display panel includes a second gate drive circuit 115 that is disposed on the side of the first display screen 111 away from the second display screen 112 and that is coupled to the first scan line 120, and a third gate drive circuit 116 that is disposed on the side of the second display 112 away from the first display 111 and that is coupled to the second scan line 130. The first gate drive circuit 113, the second gate drive circuit 115, and the third gate drive circuit 116 receive the same clock signals. In particular, two adjacent gate drive circuits may be coupled to the same set of clock signal wires, or may be coupled to different clock signal wires, but they may be controlled to receive the same clock signals through a commonly coupled timing control circuit.

The second gate drive circuit 115 and the first gate drive circuit 113 jointly drive the first display screen 111, while the third gate drive circuit 116 and the first gate drive circuit 113 jointly drive the second display screen 112, thus reducing the work load of the first gate drive circuit 113 on the first display screen side and the second display screen side, effectively reducing the distance between the farthest ends of the scan lines and the gate drive circuit, thereby reducing the load while improving the scan waveform. The first gate drive circuit 113, the second gate drive circuit 115, and the third gate drive circuit 116 receive the same clock signals, and jointly drive the display panel 110, so that the scanning performance of the scan lines can become better, the control of turning on and off the pixels can be more accurate. As such, the display panel 110 would have a small load, the signals can be better synchronized, hence a superior display effect of the display panel 110.

Figure 6:
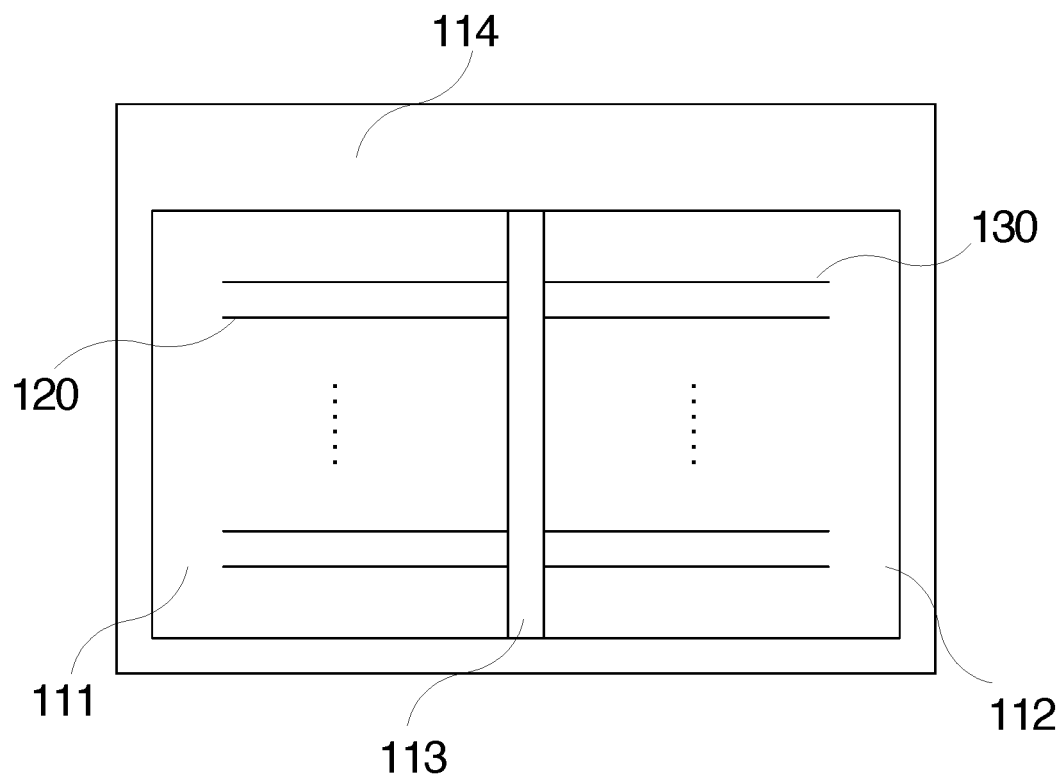
FIG. 6 is a schematic diagram of a glass substrate according to an embodiment of the present application.
Figure 7:
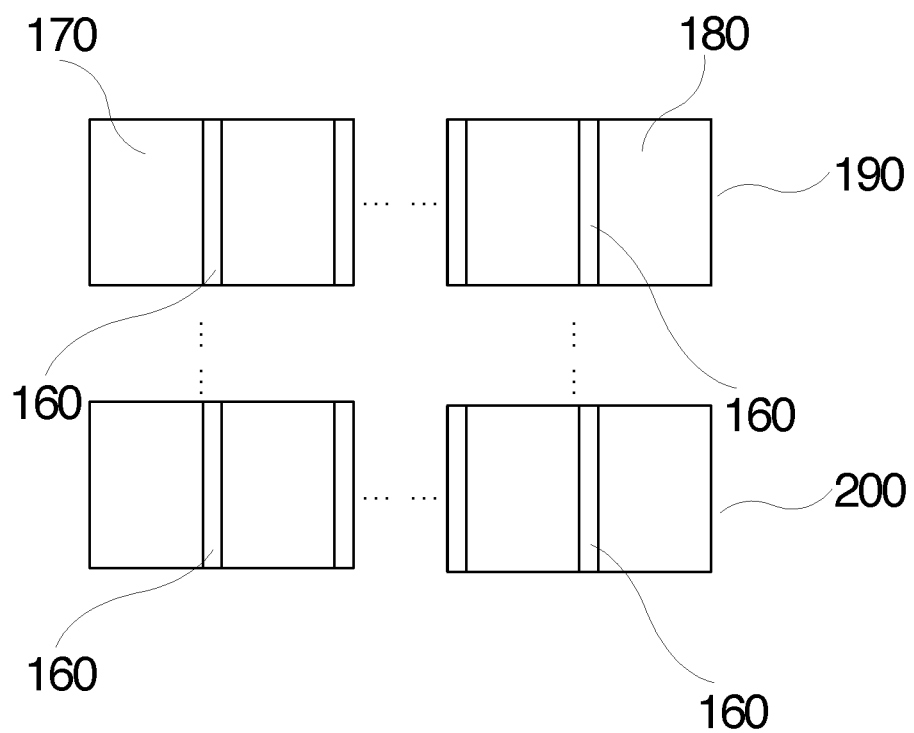
FIG. 7 is a schematic diagram of an M*N display screen according to an embodiment of the present application.

As illustrated in FIG. 6, the first gate drive circuit 113 is disposed between the first display screen 111 and the second display screen 112, and the first display screen and the second display screen are integrally formed. As illustrated in FIG. 7, the display panel may include an integrally formed glass substrate 114. In particular, the metal wiring, the layer and film structures, (for example, data lines, scan lines, gate drive circuit wires, active switches, etc.) and the like corresponding to the first display screen 111 and the second display screen 112 may be all formed on a large glass substrate 114 through the same manufacturing process.

The metal wires and layer film structures corresponding to the first display screen 111, and the metal wires and layer film structures corresponding to the second display screen 112 may share the same manufacture process, or they may be formed on the same large glass substrate 114 through different manufacture processes. In this solution, the first display screen 111 and the second display screen 112 may be formed through the same manufacturing process, thus reducing the manufacturing process and process flow, thus providing high production efficiency and a low production cost. At the same time, the assembling steps of the first display screen 111 and the second display screen 112 are omitted, such that assembling errors will not occur, and the display panel 110 will not be prone to quality problems.

In the above description, the glass substrate may be a whole large glass substrate. Of course, glass substrates made of other material manufacture processes are also possible as long as they are applicable.

As illustrated in FIG. 7, the display panel may include a number of N display screens including the first display screen and the second display screen, where the N display screens are aligned side by side from the first display screen 170 to the Nth display screen, where two adjacent display screens are coupled through the same gate drive circuit 160. The display panel may include a number of M display rows arranged closely in the vertical direction. The M display rows are arranged in sequence from the first display row 190 to the Mth display row 200. Each display row may include a number of N display screens arranged side by side, where N is a positive integer greater than or equal to 2, and M is a positive integer greater than or equal to 1. A gate drive circuit 160 may be provided between every two adjacent display screens, and the gate drive circuit 160 is coupled to each of the two adjacent display screens. As long as the implementation is possible, the gate drive circuit may be arranged on the upper side or both sides of the display screen, and it is also possible to couple to the first scan line and the second scan line through connecting lines.

When large-size products are driven using GOA, because the drive circuit has a heavy load, the bilateral drive mode is often used. However, when the size is further increased, the bilateral drive may also not meet the demand. The display panel may be assembled by multiple display screens, and the size may be formed as required on the same glass substrate through the same manufacturing process, or it may be formed separately before being assembled. In addition, by two adjacent display screens being coupled through the same gate drive circuit, it is equivalent to that each display screen corresponds to at least one gate drive circuit, so that the load corresponding to each gate drive circuit would not get too high. Theoretically, it is possible to form the display panel by arranging an infinite number of display screens side by side. That is, based on the current technical level, a practical even larger size display panel may be manufactured.

Figure 8:
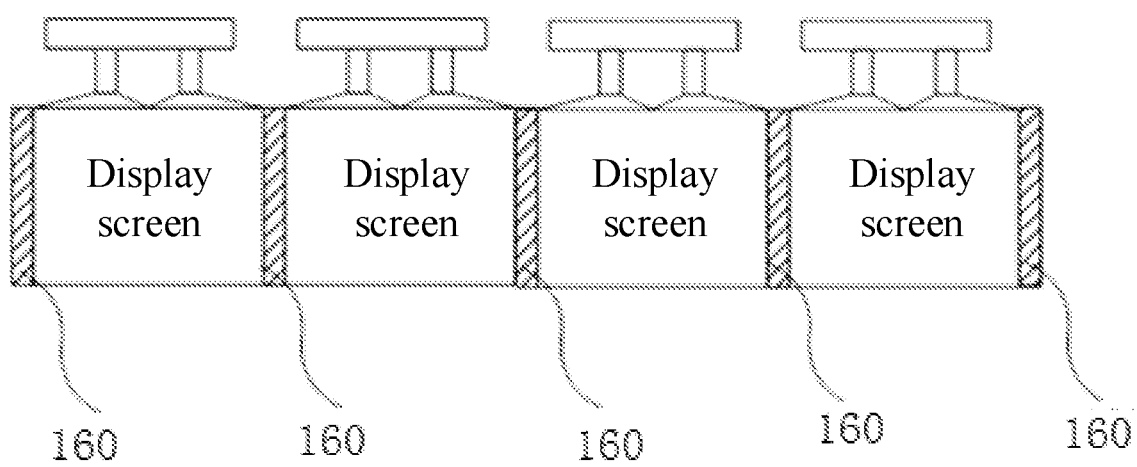
FIG. 8 is a schematic diagram of five gate drive circuits according to an embodiment of the present application.

As illustrated in FIG. 8, there are at least five gate drive circuits. That is, five gate drive circuits may be used for driving, and the number can be increased infinitely. A gate drive circuit 160 may be provided between two adjacent display screens, so that the gate drive circuit 160 in the middle can drive the display panels on both sides. Further, providing a gate drive circuit on the side of the edge display screen far away from the middle display screen can reduce the workload of the middle gate drive circuit. Thus, it leads to higher gate drive efficiency, a faster response speed, hence a superior display effect of the display panel.

Figure 9:
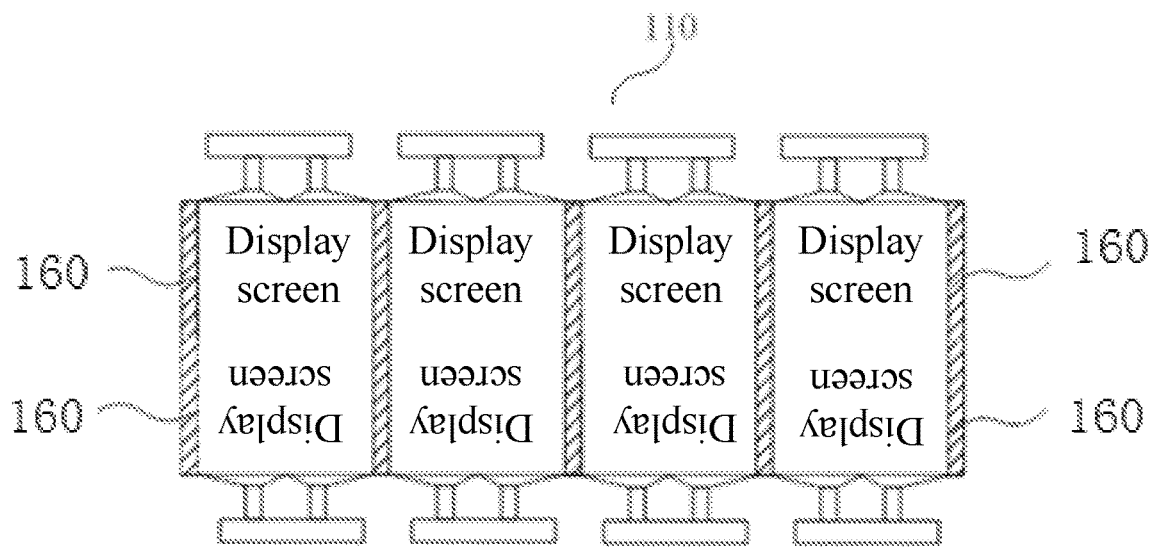
FIG. 9 is a schematic diagram of ten gate drive circuits according to another embodiment of the present application.

Similar to above, as illustrated in FIG. 9, we may also use a number of 10 gate drive circuits for driving purposes. That is, based on the current technical level, it is possible to manufacture and obtain practically even larger display panels and the number of groups can be increased indefinitely.

If the far end of the scan line is too far away from the gate drive circuit, the scan waveform may change from a rectangular waveform to an arc waveform, and problems may occur, such as failure to conduct normally when it is supposed to turned on, and failure to well turn off when it is supposed to be turned off. This limits the maximum size of the display panel based on the configuration where the gate drive circuit is arranged at one side. In contrast, this application drives the scan lines on both sides from the middle of the scan lines corresponding to the two display screens, so that the gate drive circuit may be arranged in the middle of the panel. Thus, the distance between the far end of the scan line and the gate drive circuit can be adjusted to avoid excessive load and serious waveform distortion, which is beneficial to further increase the size of the display panel.

Figure 10:
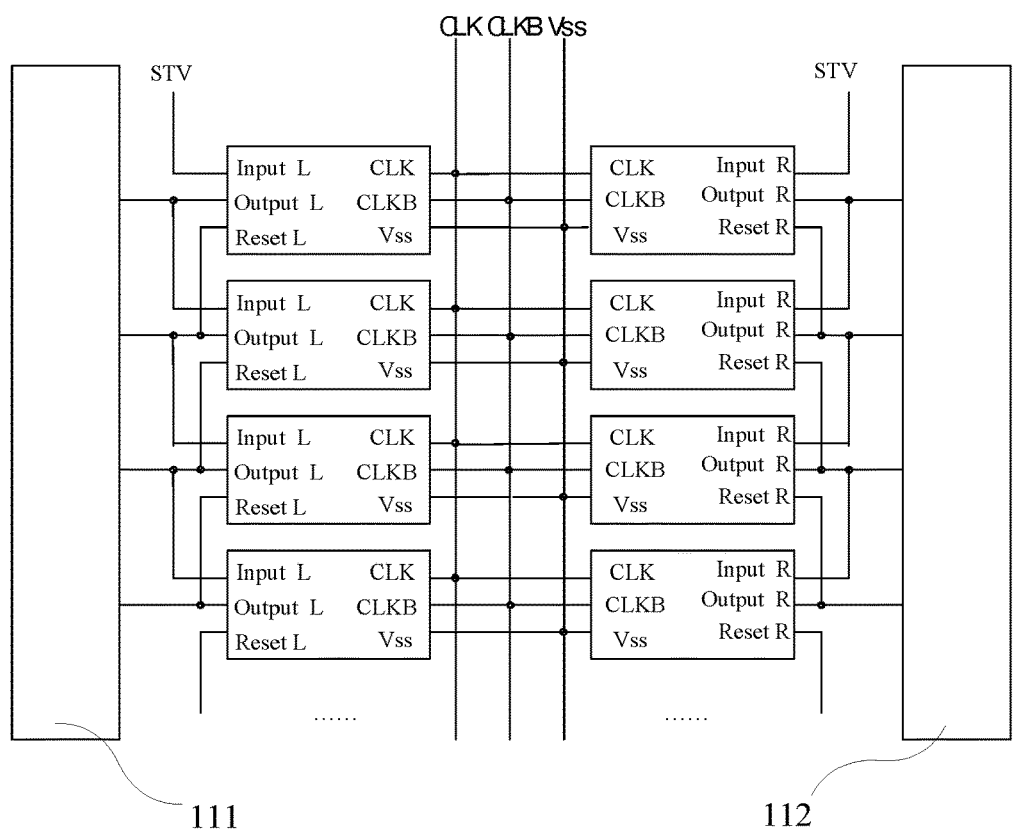
FIG. 10 is a schematic diagram of a circuit configuration in which two sets of gate drive sub-circuits are coupled to a same set of clock signal wires according to an embodiment of the present application.

As illustrated in FIG. 10, as another embodiment of the present application, the display panel 110 is provided with a non-inverted clock signal line CLK, an inverted clock signal line CLKB, a low-voltage signal line Vss, and a gate start signal (Start Vertical, STV). Each display screen is provided with N scan lines. The gate drive circuit is correspondingly arranged between two adjacent display screens. The gate drive circuit includes two sets of gate drive sub-circuits. Each set of gate drive sub-circuits includes a number of N gate drive sub-circuits in one-to-one correspondence with the scan lines.

Figure 11:
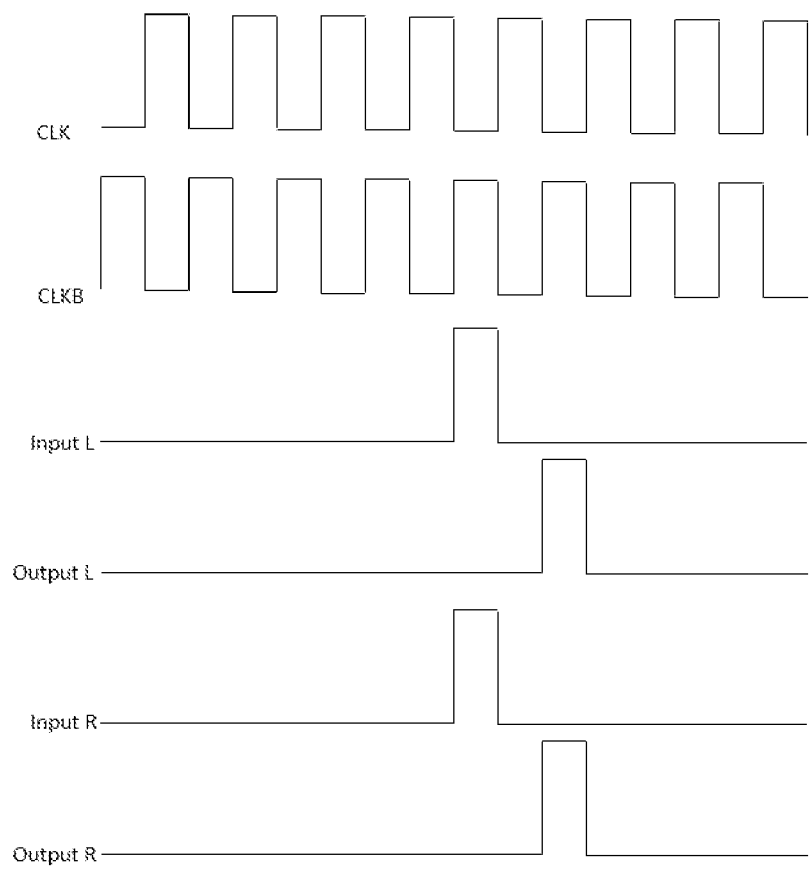
FIG. 11 is a schematic diagram of a clock signal waveform of according to embodiment of the present application.

A part of the bus line (common line) is shared to achieve the purpose of bilateral output of the gate drive circuits. The first gate drive sub-circuit and the second gate drive sub-circuit are each coupled to the first non-inverted clock signal line, the first inverted clock signal line, and the first low-voltage signal line. The first gate drive sub-circuit 1131 includes a number of N gate drive sub-circuits, while the second gate drive sub-circuit 1132 includes a number of N gate drive sub-circuits, where each gate drive sub-circuit includes a non-inverted clock signal input terminal CLK, an inverted clock signal input terminal CLKB, and a low voltage signal input terminal Vss. The clock signal received by each drive sub-circuit is the same. In addition, each gate drive sub-circuit also includes an input terminal Input, an output terminal Output, and a reset terminal Reset. The output of each row of gate drive sub-circuits is used as the input of the next row of gate drive sub-circuits, and serves as the reset terminal of the previous row of gate drive sub-circuits. In order to distinguish the two sets of gate drive sub-circuits, in FIG. 10, the input terminals of the two sets of gate drive sub-circuits are respectively denoted by Input R and Input L, the output terminals are respectively denoted by Output R and Output L, and the reset terminals are respectively denoted by Reset R and Reset L. The waveform diagram of the timing of each the various signals of the gate drive sub-circuit is illustrated in FIG. 11.

The input terminal of the Nth gate drive sub-circuit is coupled to the output terminal of the (n−1)th gate drive sub-circuit. The output terminal of the Nth gate drive sub-circuit is coupled to the reset terminal of the (n−1)th gate drive sub-circuit and to the scan line. The reset terminal of the Nth gate drive sub-circuit is coupled to the output terminal of the (N+1)th gate drive sub-circuit. The input terminal of the first gate drive sub-circuit corresponding to the first row of scan line is coupled to the gate start signal. The last gate drive sub-circuit corresponding to the last row of scan line is directly coupled to the last row of scan line. In the above description, N is a positive integer greater than or equal to 2.

Each gate drive sub-circuit is coupled to the same non-inverted clock signal line CLK, inverted clock signal line CLKB, and low-voltage signal line Vss, and thus may output the same signals to the display screen at both sides which are thus driven simultaneously. In addition, the farthest distance between the scan line and the gate drive circuit can be greatly shortened, and the load of the scan line between the far end of the scan line and the gate drive circuit is greatly reduced, which can greatly improve the scan waveform at the far end of the scan line. The improved waveform is illustrated in FIG. 9. Furthermore, the scan line may work steadily, thereby improving the problem of excessive load on the large-size display panel, and the severe scanning waveform distortion caused by excessive load. The reasonable configuration of the input terminal, the output terminal, and the reset terminal enables each gate drive circuit to work steadily.

Figure 12:
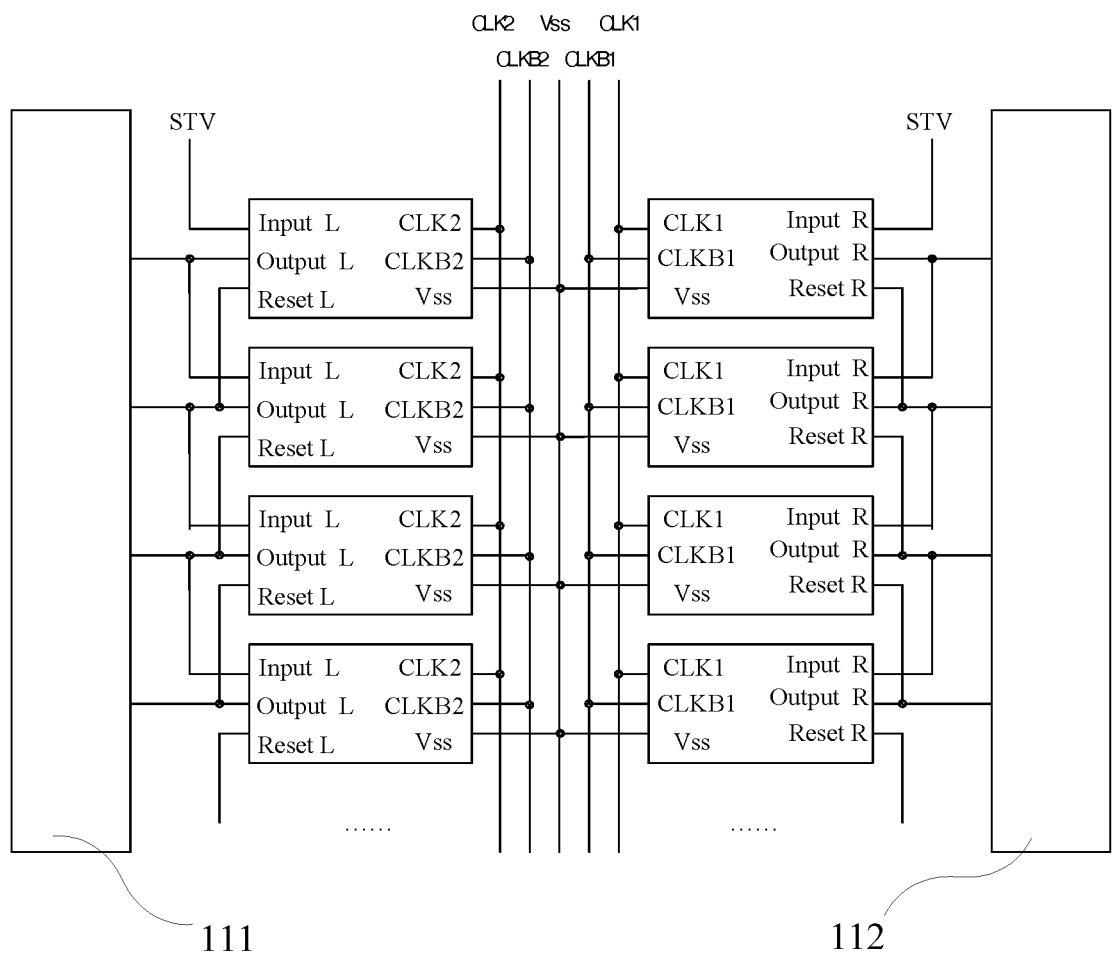
FIG. 12 is a schematic diagram of a circuit configuration in which two sets of gate drive sub-circuits are coupled to two sets of clock signal wires according to an embodiment of the present application.

As illustrated in FIG. 12, as another embodiment of the present application, which differs from the above-mentioned embodiment in that the display panel 110 is provided with a first non-inverted clock signal line CLK1, a second non-inverted clock signal line CLK2, a first inverted clock signal line CLKB1, second inverted clock signal line CLKB2, and a low voltage signal line Vss. Each display screen is provided with a number N scan lines. The gate drive circuit includes two sets of gate drive sub-circuits, and each set of gate drive sub-circuits includes a number of N gate drive sub-circuits in one-to-one correspondence with the scan lines. The two sets of gate drive sub-circuits are respectively coupled to the first non-inverted clock signal line CLK1 and the second non-inverted clock signal line CLK2. The two sets of gate drive sub-circuits are respectively coupled to the first inverted clock signal line CLKB1 and the second inverted clock signal line CLKB2. In particular, the two sets of gate drive sub-circuits are coupled to the same low-voltage signal line Vss, and the two sets of gate drive sub-circuits with the same timing output use a shared Bus line (common line) to achieve the purpose of bilateral output.

Figure 13:
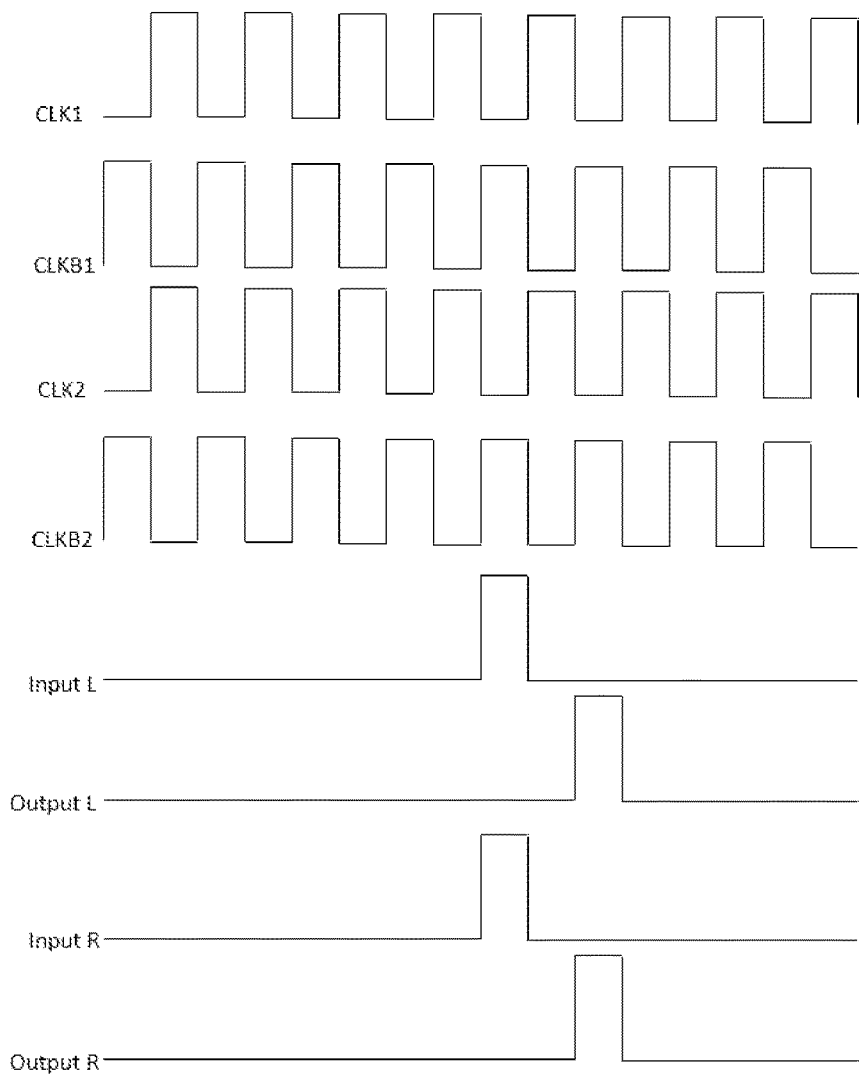
FIG. 13 is a schematic diagram of a clock signal waveform of according to embodiment of the present application.

Compared with the scheme where the gate drive circuit is merely capable of unilateral output, this application can set the first gate drive circuit in the middle of the first display screen and the second display screen, so that the two display screens can choose to use the same gate drive circuit for driving purposes, and the gate drive circuit can choose to drive the display screen at one or both sides from the middle of the entire display panel. Accordingly, the first gate drive circuit controls the scanning of the scan lines corresponding to the two display screens, thus achieving the purpose of bilateral output. In this way, the farthest distance from the scan lines in the first display screen and the second display screen to the gate drive circuit can be greatly shortened (as opposed to arranging the gate drive circuit on the side of the display panel), so that the resistance of the scan line between the gate drive circuit and the gate drive circuit becomes smaller, the load is greatly reduced, which can greatly improve the scan waveform at the far end of the scan lines (the improved waveform is illustrated in FIG. 13). Thus, the scan line will be able to work steadily, thereby improving the excessive load of the large-size display panel, as well as the severe distortion of the scanning waveform caused by the excessive load.

Figure 14:
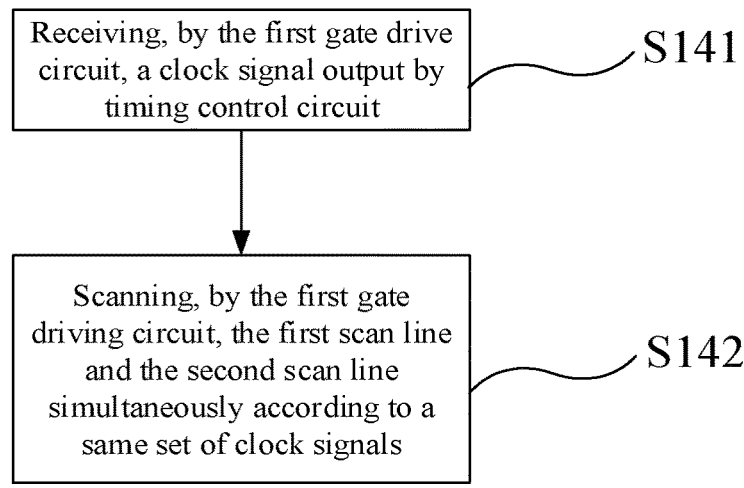
FIG. 14 is a schematic diagram illustrating the operations of a method according to an embodiment of the application.
Figure 15:
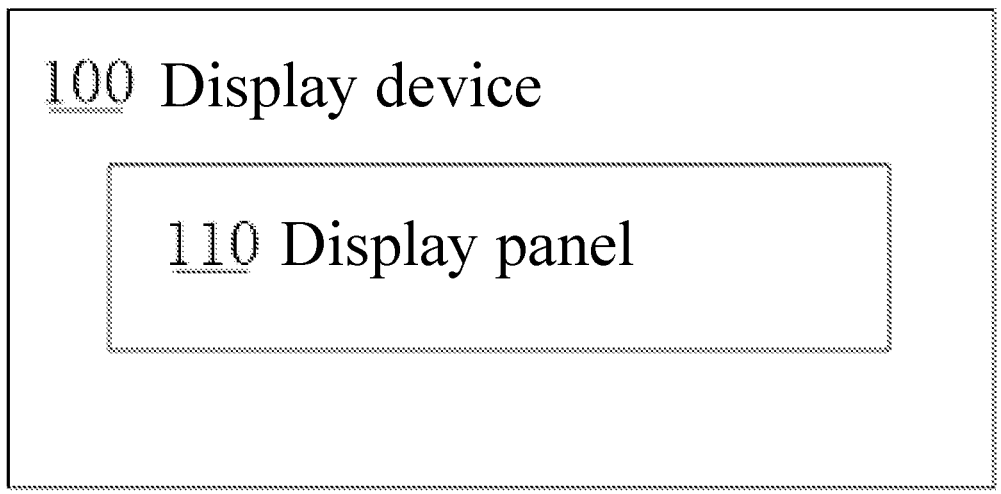
FIG. 15 is a schematic diagram of a display device according to another embodiment of the present application.

As another embodiment of the present application, as illustrated in FIG. 14, a driving method a display panel is disclosed, where the display panel 110 includes a timing control circuit. The driving method may include the following operations:

S141: receiving, by the first gate drive circuit, a clock signal output by the timing control circuit; and S142: scanning, by the first gate drive circuit, the first scan line and the second scan line simultaneously according to a same set of clock signals.

In this solution, the same gate drive circuit is shared between two adjacent display screens, so that the gate drive circuit can drive the displays on both sides at the same time. Furthermore, the farthest distance between the scan line and the gate drive circuit can be greatly shortened, so that the loads of the scan lines between the far ends of the scan lines and the gate drive circuit are greatly reduced, which can greatly improve the scan waveform at the far ends of the scan lines, so that the scan line cans work steadily, thereby improving issues of excessive load of the large-size display panel, as well as issues of severe distortion of the scan waveform caused by the excessive load, or other issues. The gate drive circuit scans the first scan line and the second scan line at the same time based on the same set of clock signals, making it possible for the display screen to increase infinitely.

By analogy, there may be arranged a corresponding gate drive circuit between every two adjacent display screens that are arranged side by side, and the gate drive circuit located between two adjacent display screens will simultaneously drive the scan lines in the display screens on both sides.

As another embodiment of the present application, unlike the above-mentioned embodiment, the display panel includes a plurality of display screens and first gate drive circuits. The plurality of display screens are arranged in X*Y and formed on the same substrate. The first gate drive circuit is arranged between two adjacent display screens to drive the two adjacent display screens. In the above description, X indicates the number of display screens in each column in a first direction, Y indicates the number of display screens in each row in a second direction, where the first direction and the second direction are perpendicular to each other; the two adjacent display screens are respectively a first display screen and a second display screen arranged adjacent to the first display screen in the second direction; the first gate drive circuit drives the first display screen and the second display screen.

It should be noted that the second direction refers to the direction of extension of the scan lines of the first display screen and the second display screen. The X display panels arranged in each row of the display panel in the second direction are, counted from one end to the other, the first display screen, the second display screen, . . . , and the Xth display screen. Each row of in the second direction is provided with number of X−1 first gate drive circuits, and each first gate drive circuit is correspondingly provided between two adjacent display screens. In addition, the display panel further includes a second gate drive circuit, which is provided in the number of two in each row in the second direction, which are respectively provided on the side of the first display screen away from the Xth display screen, and the side of the Xth display screen away from the first display screen. In the case of a certain glass size, the value of X is 1 and the value of Y is 2, so that the requirement of large size can be satisfied.

In order that the drive signals of the first gate drive circuit are accurately output to the display screens on both sides, the scan lines of the first display screen and the second display screen are not coupled to each other. In the case that the scan lines are not coupled, two adjacent displays can display one picture together or display different pictures separately by adjusting the input signals. The first gate drive circuit may include a bilateral gate drive circuit, which receives a set of input signals, and outputs two sets of scanning signals to simultaneously drive the scan lines of the first display screen and the second display screen. In particular, the first gate drive circuit may include a first unilateral gate drive unit and a second unilateral gate drive unit. The first unilateral gate drive unit receives a set of input signals, and outputs a set of scan signals to drive the first display screen. The second unilateral gate driving unit receives another set of input signals and outputs another set of scanning signals to drive the second display screen.

Of course, the scan lines of the first display screen and the second display screen may also be coupled to each other. The first gate drive circuit may include a bilateral gate drive circuit, which receives a set of input signals, and outputs a set of scanning signals to simultaneously drive the scan lines of the first display screen and the second display screen. The access position of the output terminal of the bilateral gate drive circuit may be located at the connection of the scan lines of the first display screen and the second display screen. In the case where the scan lines are coupled to each other, if a problem occurs on one side of the bilateral gate drive circuit, the other side can ensure that the display panel will not be unusable due to poor display effect.

It should be noted that the technical solutions of this application can be combined on the condition of not conflicting with or contradicting each other.

It should also be noted that the steps that are defined in this application are not deemed to limit the order in which the steps are performed, on the condition of not affecting the implementation of the specific plan. The steps written earlier may be executed earlier or later than those recited later, or they may even be performed simultaneously. Thus, long as the solutions can be implemented, these solutions shall all be regarded as falling in the scope of protection of this application.

The technical solutions of this application may be widely used in various display panels, such as TN (Twisted Nematic) display panels, IPS (In-Plane Switching) display panels, VA (Vertical Alignment) Display panel, MVA (Multi-Domain Vertical Alignment) display panels. Of course, the above solutions may also be applicable to other types of display panels, such as OLED (Organic Light-Emitting Diode) display panels.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A display panel, comprising:
    a plurality of display screens, which are arranged in a pattern of X*Y and formed on a same substrate; and
    a first gate drive circuit, arranged between every two adjacent display screens and configured to drive the two adjacent display screens;
    where X denotes the number of display screens in each column in a first direction, Y denotes the number of display screens in each row in a second direction, wherein the first direction is perpendicular to the second direction;
    where X is a positive integer greater than or equal to 1, and Y is a positive integer greater than or equal to 2;
    wherein every two adjacent display screens are respectively a first display screen, and a second display screen arranged adjacent to the first display screen in the second direction;
    wherein the first gate drive circuit is configured to drive the first display screen and the second display screen; and
    wherein the second direction is a direction of extension of scan lines in the first display screen and the second display screen;
    wherein the scan line of the first display screen are not coupled to the scan line of the second display screen;
    wherein the first gate drive circuit comprises a bilateral gate drive circuit, which is configured to receive a set of input signals, and output two sets of scanning signals to simultaneously drive the scan line of the first display screen and the scan line of the second display screen.

2. The display panel of claim 1, wherein the plurality of display screens and first gate drive circuits are formed on a same substrate through a common process.

3. The display panel of claim 1, wherein X has a value of 1, and Y has a value of 2.

4. A display panel, comprising:
    a plurality of display screens, which are arranged in a pattern of X*Y and formed on a same substrate; and
    a first gate drive circuit, arranged between every two adjacent display screens and configured to drive the two adjacent display screens;
    where X denotes the number of display screens in each column in a first direction, Y denotes the number of display screens in each row in a second direction, wherein the first direction is perpendicular to the second direction;
    where X is a positive integer greater than or equal to 1, and Y is a positive integer greater than or equal to 2;
    wherein every two adjacent display screens are respectively a first display screen, and a second display screen arranged adjacent to the first display screen in the second direction;
    wherein the first gate drive circuit is configured to drive the first display screen and the second display screen; and
    wherein the second direction is a direction of extension of scan lines in the first display screen and the second display screen;
    wherein the scan line of the first display screen is coupled to the scan line of the second display screen;
    wherein the first gate drive circuit comprises a bilateral gate drive circuit, which is configured to receive a set of input signals, and output a set of scanning signals to simultaneously drive the scan line of the first display screen and the scan line of the second display screen;
    wherein an access position of an output end of the bilateral gate drive circuit is located at a connection of the scan line of the first display screen and the scan line of the second display screen.

* * * * *